United States Patent [19]

Kodama

[11] Patent Number: 5,005,662
[45] Date of Patent: *Apr. 9, 1991

[54] POWER TRANSMISSION SYSTEM FOR A FOUR-WHEEL DRIVE VEHICLE

[75] Inventor: Yukio Kodama, Gunma, Japan

[73] Assignee: Fuji Jukogyo Kabushiki Kaisha, Tokyo, Japan

[*] Notice: The portion of the term of this patent subsequent to Feb. 21, 2006 has been disclaimed.

[21] Appl. No.: 494,719

[22] Filed: Mar. 15, 1990

Related U.S. Application Data

[62] Division of Ser. No. 338,714, Apr. 14, 1989, which is a division of Ser. No. 63,173, Jun. 15, 1987, Pat. No. 4,896,738.

[30] Foreign Application Priority Data

| Jun. 20, 1986 | [JP] | Japan | 61-144475 |
| Jun. 20, 1986 | [JP] | Japan | 61-144476 |
| Jun. 20, 1986 | [JP] | Japan | 61-144477 |
| Jun. 20, 1986 | [JP] | Japan | 61-144478 |
| Jun. 20, 1986 | [JP] | Japan | 61-144479 |

[51] Int. Cl.$^5$ ............... B60K 17/34; B60K 23/08
[52] U.S. Cl. ............................ 180/233; 180/247; 180/249
[58] Field of Search ........... 180/233, 247, 248, 197; 280/91, 702, 707

[56] References Cited

U.S. PATENT DOCUMENTS

| 4,630,704 | 12/1986 | Yamakawa et al. | 180/247 |
| 4,805,721 | 2/1989 | Takahashi et al. | 180/248 |
| 4,896,738 | 1/1990 | Kodama | 180/233 |

Primary Examiner—Mitchell J. Hill
Attorney, Agent, or Firm—Martin A. Farber

[57] ABSTRACT

A torque distribution deciding control unit and an oil hydraulic clutch having opposite disks are provided. The clutch is disposed in a power transmitting system for four-wheel drive. One of disks is operatively connected to one of side gears of a central differential through a gear train and the other of the disks is operatively connected to the other side gear of the central differential through another gear train, whereby torque is transmitted to front and rear wheels at a distribution ratio. Loads on wheels such as weights on front and rear axles are detected. The control unit operates the clutch so as to distribute the torque at a ratio in accordance with loads on both axles.

6 Claims, 9 Drawing Sheets

POWER TRANSMISSION SYSTEM FOR A FOUR-WHEEL DRIVE VEHICLE

RELATED APPLICATION

This application is a division of my co-pending application Ser. No. 07/338,714 filed Apr. 14, 1989 which in turn is a division of my application Ser. No. 07/063,173 filed Jun. 15, 1987 (now U.S. Pat. No. 4,896,738 issued Jan. 30, 1990).

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformly distribute the torque of an engine to front wheels and to rear wheels.

It is known that the distribution ratio of torque has influences on driveability, steerability, stability, starting characteristic and others. Namely, at high vehicle speed the distribution to the front wheel is increased so that stable cornering characteristic is established, and at low vehicle speed distribution to the rear wheels is increased so that steerability is improved.

Japanese Patent Laid Open No. 56-43031 discloses such a transmitting system, in which the distribution ratio of torque for front wheels to rear wheels is controlled depending on the vehicle speed detected by a vehicle speed sensor.

However, vehicle speed is not sufficient as a factor for controlling the torque distribution. For example, even if a rear trunk of a motor vehicle is loaded with a heavy cargo, the ratio of front and rear torques is the same as the ratio at light load. Accordingly, torque distribution becomes unbalanced, so that accelerating ability and up hill ability reduce. Further, the coefficient of friction of road surface affects the steerability and stability.

SUMMARY OF THE INVENTION

The subject of the present invention is to provide a system which may change the distribution ratio of torque to front wheels and rear wheels in accordance with various driving conditions of a four-wheel drive vehicle without loss of torque.

According to the present invention, there is provided a power transmitting system for a four-wheel drive vehicle in which power of an engine is transmitted to front and rear wheels through a central differential. The system comprises a torque distribution device including clutch means provided for changing torque transmitted to the front and rear wheels, detecting means for detecting forces exerted on wheels of the vehicle and for producing an output signal, control means responsive to the output signal for rendering the clutch means operative so as to change torque distribution ratio of the front wheels to the rear wheels.

The other objects and features of this invention will become understood from the following description with reference to the accompanying drawings.

DETAILED DESCRIPTION OF THE PREFERRED EMBODIMENT

Figure 1:
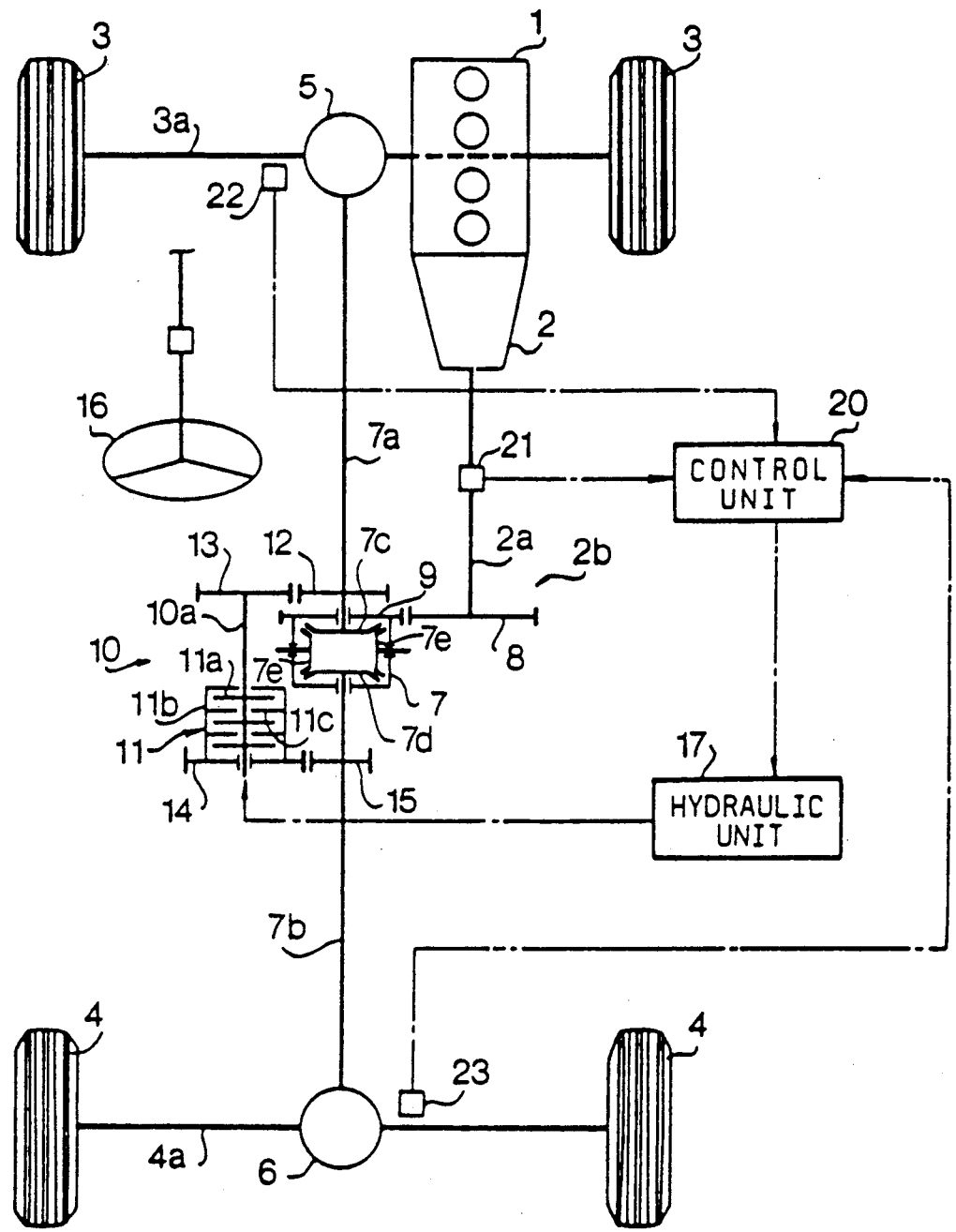
FIG. 1 is a schematic diagram showing a system according to the present invention.

Referring to FIG. 1 showing a power transmission system for a four-wheel drive vehicle, reference numeral 1 designates an engine mounted on a front portion of the vehicle. The power of the engine 1 is transmitted to a transfer device 2b through a transmission 2. In the transfer device 2b, rotation of an output shaft 2a of the transmission 2 is transmitted to a central differential 7 through gears 8 and 9. The central differential 7 comprises a pair of side gears (outputs) 7c and 7d engaged with pinions 7e. A shaft 7a secured to the side gear 7c of the differential 7 is operatively connected to a front differential 5 so as to drive front wheels 3. On the other hand, a shaft 7b secured to the other side gear 7d is operatively connected to a rear differential 6 so as to drive rear wheels 4. Thus, the central differential 7 operates to absorb the difference between speeds of front and rear wheels.

In the system of the present invention, a torque distribution device 10 is provided over the central differential 7. The torque distribution device 10 has a gear 12 secured to the front drive shaft 7a and a gear 15 secured to the rear drive shaft 7b. The gear 12 engages with a gear 13 having the same diameter as the gear 12 and secured to a bypass shaft 10a and the gear 15 engages with a large gear 14. The gears 14 and 15 are arranged to have a gear ratio K. The shaft 10a is inserted into an oil hydraulic clutch 11 and gear 14 is secured to a drum 11b of the clutch 11. The clutch has a plurality of disks 11a secured to the shaft 10a and disks 11c secured to the drum opposite the disks 11a. The clutch 11 is arranged to transmit the torque from a higher speed disk side to a lower speed disk side. A steering wheel 16 is also shown in the figure.

The system has an output torque sensor 21 for sensing the output torque T of the transmission 2 on the shaft 2a. The system further has a front axle load sensor 22 and a rear axle load sensor 23 for respectively sensing loads (weights) $W_f$ and $W_r$ on front and rear axles 3a and 4a of the wheels 3 and 4. A control unit 20 which is supplied with outputs of the sensors 21, 22 and 23 produces an output signal which is applied to a hydraulic unit 17 to control oil pressure applied to the oil clutch 11.

Figure 2:
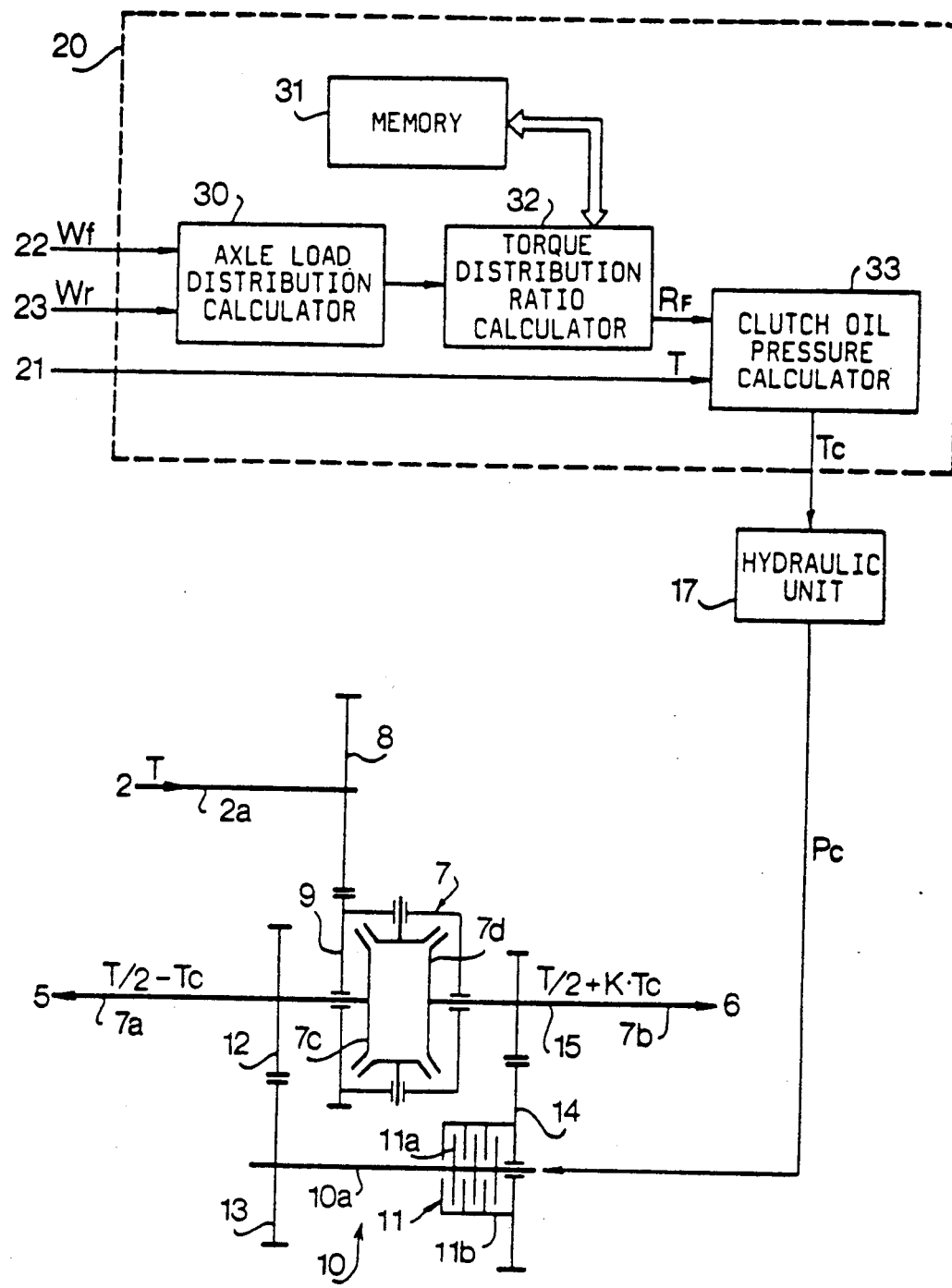
FIG. 2 shows a block diagram of a control unit and a torque distribution system of the present invention.
Figure 3:
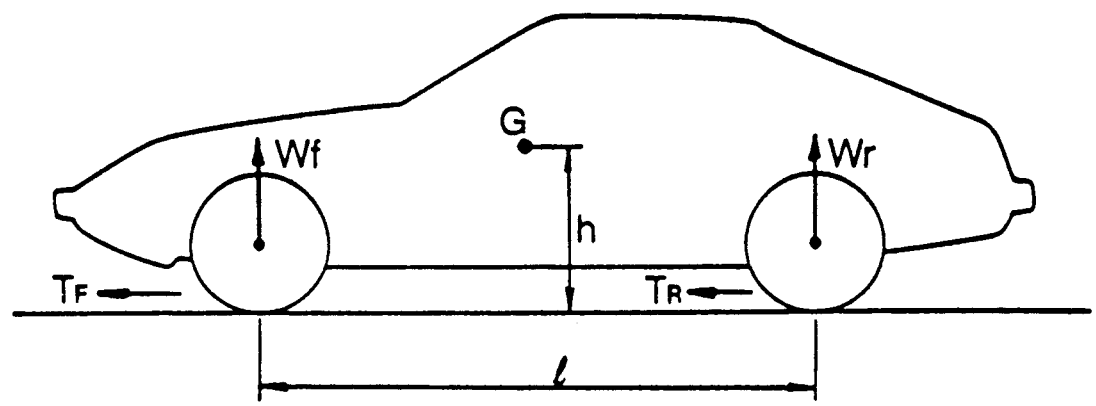
FIG. 3 is a diagram explaining the principle of the first embodiment.

Referring to FIG. 2, the control unit 20 is provided with an axle load distribution calculator 30 supplied with output signals of the sensors 22 and 23 so as to calculate load distribution ratio $W_f/(W_f+W_r)$ of the front axle. The output of the load distribution calculator 30 is applied to the torque distribution ratio deciding section 32. Desirable torque distribution ratios for the front wheels are stored in a memory 31. A clutch oil pressure calculator 33 to which an output of the output torque sensor 21 is applied, calculates a necessary clutch torque Tc.

In operation, the output torque T on the output shaft 2a is transmitted to the central differential 7, at which the torque is divided to side gears 7c and 7d. The divided torques are transmitted to front and rear drive shafts 7a and 7b. At the same time, the torques are transmitted to disks 11a of the oil clutch 11 through gears 12, 13 and shaft 10a and to the drum 11b through gears 15 and 14, respectively. Since the speed of the drum 11b is reduced by the gear ratio between gears 14 and 15, the torque is transmitted from disks (input members) 11a of the higher speed side to the disks (output members) 11c and the drum 11b of the lower speed side.

When oil pressure in the clutch 11 is zero, the clutch is released so as to render the members of the torque distribution device idle. Accordingly, the input torque is uniformly distributed to front and rear wheels 3 and 4 at a value corresponding to T/2.

When the oil pressure in the clutch 11 is increased by hydraulic unit 17 in accordance with the load distribution ratio, a clutch torque Tc is produced in the clutch, so that a torque dependent on the clutch torque Tc is transmitted from disks 11a to drum 11b. Accordingly, the torque $T_F$ to the front wheels is reduced by a torque based on the clutch torque Tc. To the contrary, the torque $T_R$ to the rear wheels is increased by a torque based on the clutch torque and the gear ratio K at gears 14 and 15.

Accordingly, the torque of the front drive shaft 7a is T/2−Tc, and the torque of the rear drive shaft 7b is T/2+K. Tc. Thus, torque $T_F$ decreases with increase of the torque Tc and torque $T_R$ increases with increase of torque Tc.

A principle for calculating the desired torque distribution ratio in the present invention is described hereinafter. In a conventional art, the torque distribution is calculated depending only on vehicle speed without consideration to the load on the vehicle. Therefore, even if the load on the rear axle is larger than that on the front axle during normal driving conditions, ratio of the front torque to the rear torque is at 50:50. As a result, the torque is not sufficiently exerted on the vehicle at acceleration thereof. The front axle load $W_f$ and rear axle load $W_r$ during acceleration can be expressed as below.

$$W_f = W_{fo} - (h/l) W\alpha$$

$$W_r = W_{ro} + (h/l) W\alpha$$

where $W_{fo}$ and $W_{ro}$ are loads on front and rear axles at a stop of the vehicle, respectively, l is the wheelbase, h is a height of the center of gravity, $\alpha$ (g) is acceleration of the vehicle and $W = W_{fo} + W_{ro}$.

In an ordinary central differential provided with bevel gears, the driving torque $(W\alpha)$ of the vehicle at normal driving conditions is twice the value of the front torque $(W_f\mu)$.

Thus, $$2\mu \cdot W_f = W\alpha$$

($\mu$ is coefficient of friction on road surface)
Accordingly, $$2\mu\{W_{fo} - (h/l) W\alpha\} = W\alpha \cdot$$

$$2\mu W_{fo} = \{2\mu(h/l)+1\}W$$

Therefore, $$\alpha = (2\mu W_{fo}/W) \times [1/\{(2\mu h/l)+1\}]$$

When $W_{fo}=400$ kg, $W_{ro}=600$ kg, $\mu=0.5$, $l=2.4$ m and $h=0.5$ m, $$\alpha = (2 \times 0.5 \times 400/1000) \times [1/\{2 \times 0.5 \times 0.5/2.4\}+1]$$

$$\alpha = 0.33$$

Thus, even if the engine is capable of producing very large power, acceleration exceeding 0.33 g is impossible to obtain.

In the present invention, the torque of the vehicle can be represented as follows.

$$\mu W_f + \mu W_r = W\alpha$$

thus, $$\mu W = W\alpha$$

$$\alpha = \mu = 0.5$$

Accordingly, the vehicle of the present invention can be accelerated at 0.5 g. When $T_F/T_R = W_f/W_r$, a maximum driving power can be obtained. Thus, desirable distribution ratios $R_{Fd}$ for the front wheels depending on front axle load distribution ratio $W_f/(W_f+W_r)$ are stored in the memory 31 of the control unit 20.

Figure 4:
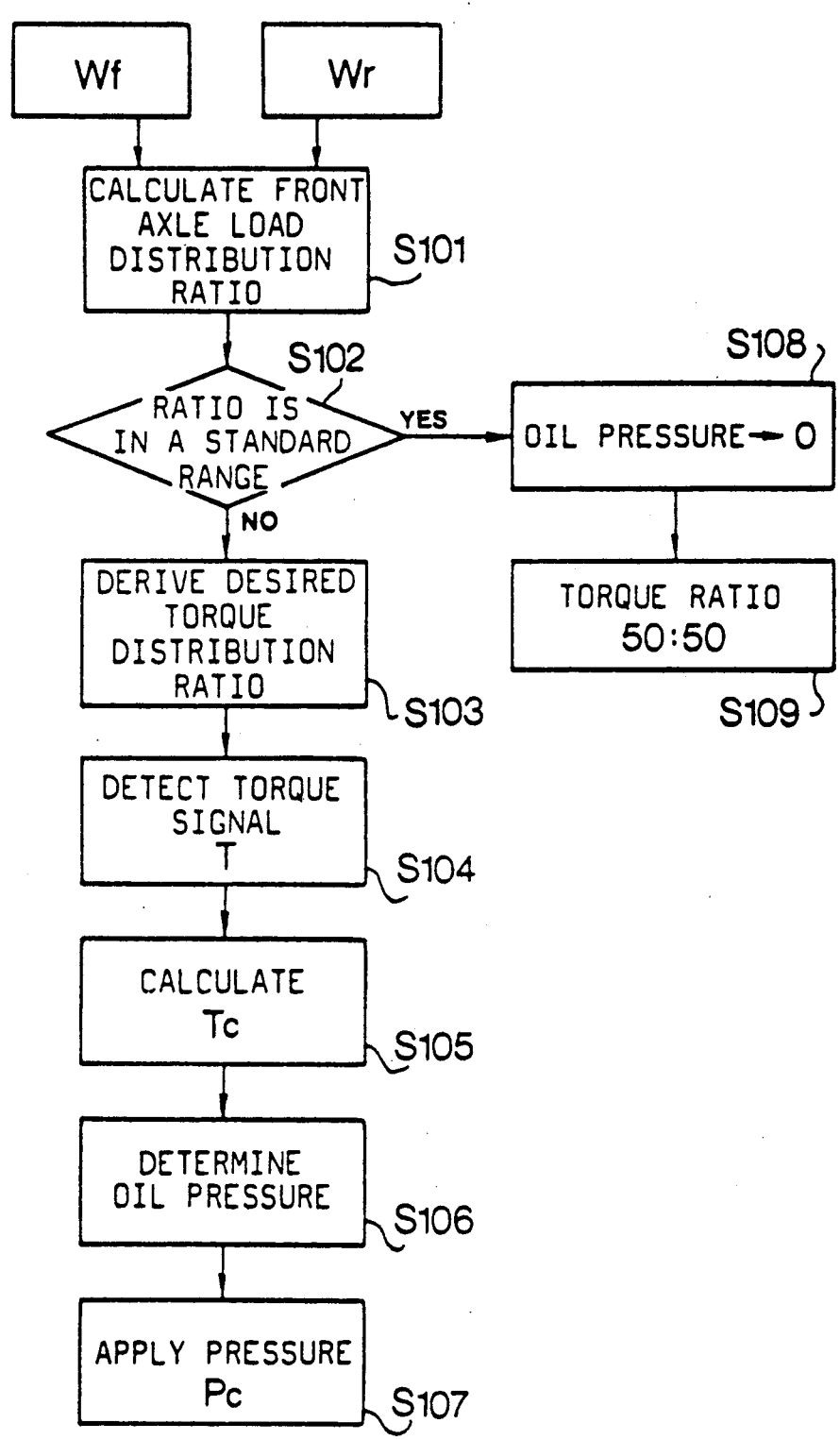
FIG. 4 is a flow chart showing the operation of the control unit.

The operation of the control unit 20 will be described hereinafter with reference to the flow chart of FIG. 4. At a step S101, the axle load distribution calculator 30 calculates the front axle load distribution ratio $W_f/(W_f+W_r)$ from the loads $W_f$ and $W_r$ detected by the sensors 22 and 23. At a step S102, it is determined whether the calculated load distribution ratio with estimated error is in a range of a standard distribution ratio. When the ratio is in the standard range, the torque distribution ratio deciding section 32 produces an output to uniformly distribute the torque. Accordingly, oil pressure calculator 33 applies an output to hydraulic unit 17 to render the pressure of the clutch 11 zero at a step S108. Thus, the clutch 11 is released so that torque distributor 10 is inoperative. Consequently, front and rear torque $T_F$ and $T_R$ to the shafts 7a and 7b is T/2 respectively so that vehicle is at four wheel driving (step S109).

On the other hand, if the load distribution ratio is out of the standard range, for example if the rear load $W_r$ is much larger because of the passengers and the cargo, a desired torque distribution ratio $R_{Fd}$ for the front axle is derived from the memory 31 at the torque distribution ratio deciding section 32 (step S103). At a step S104, the oil pressure calculator 33 is supplied with the torque signal T. Distribution ratio $R_F$ for the front wheels is expressed as follows.

$$R_F = T_F/(T_F + T_R)$$
$$= 1/\{1 + (T/2 + K \cdot T_c) \div (T/2 - T_c)\}$$

Accordingly, torque Tc is calculated by the calculator 33 to produce the predetermined distribution ratio $R_F$ with respect to output torque T at a step S105, and pressure of oil in the clutch is determined by the clutch torque Tc at a step S106. At a step S107, hydraulic unit 17 applies an appropriate pressure to the clutch 11. Thus, the rear torque $T_R$ becomes larger than the front torque $T_F$ so that it is possible to accelerate the vehicle at 0.5 g if the coefficient of friction of road surface is 0.5. Accordingly, the torque is effected without loss.

Figure 5:
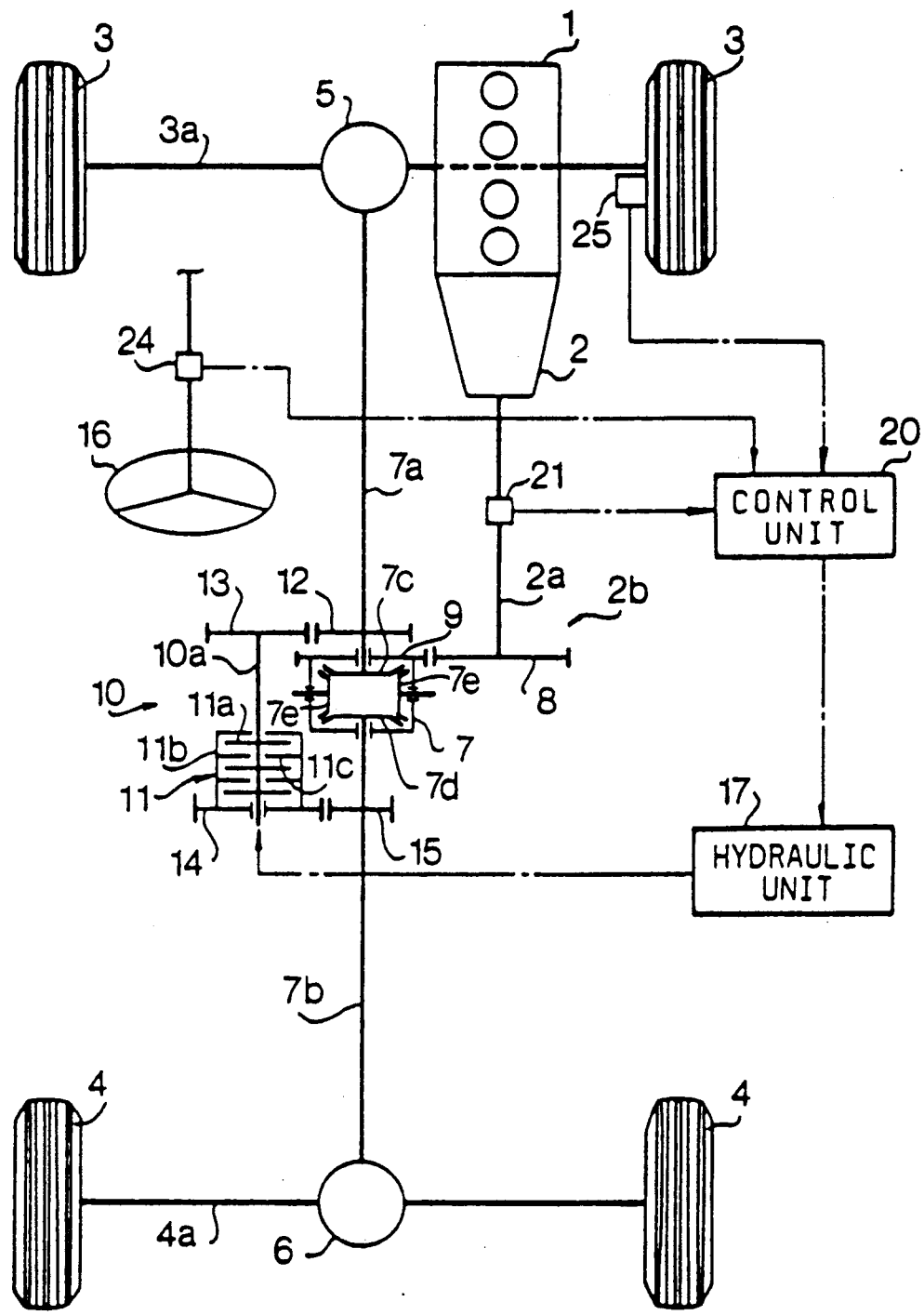
FIG. 5 is a schematic diagram showing a second embodiment of the present invention.

Referring to FIG. 5, showing another embodiment of the invention, the same parts as the system of FIG. 1 are identified by the same references as FIG. 1. The system has a steering wheel angle sensor 24 for sensing a steering angle $\theta$ of the steering wheel 16 and a vehicle speed sensor 25 provided at the front wheel 3 to detect the vehicle speed V.

Figure 6:
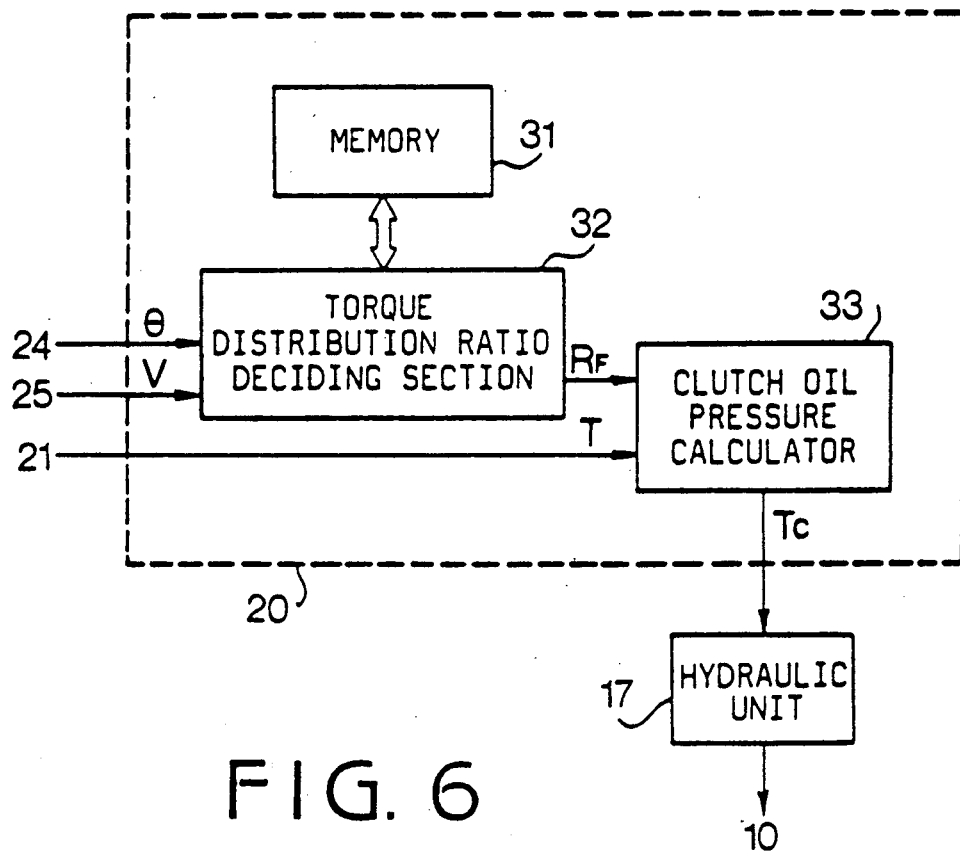
FIG. 6 is a block diagram of a control unit of the second embodiment.
Figure 7:
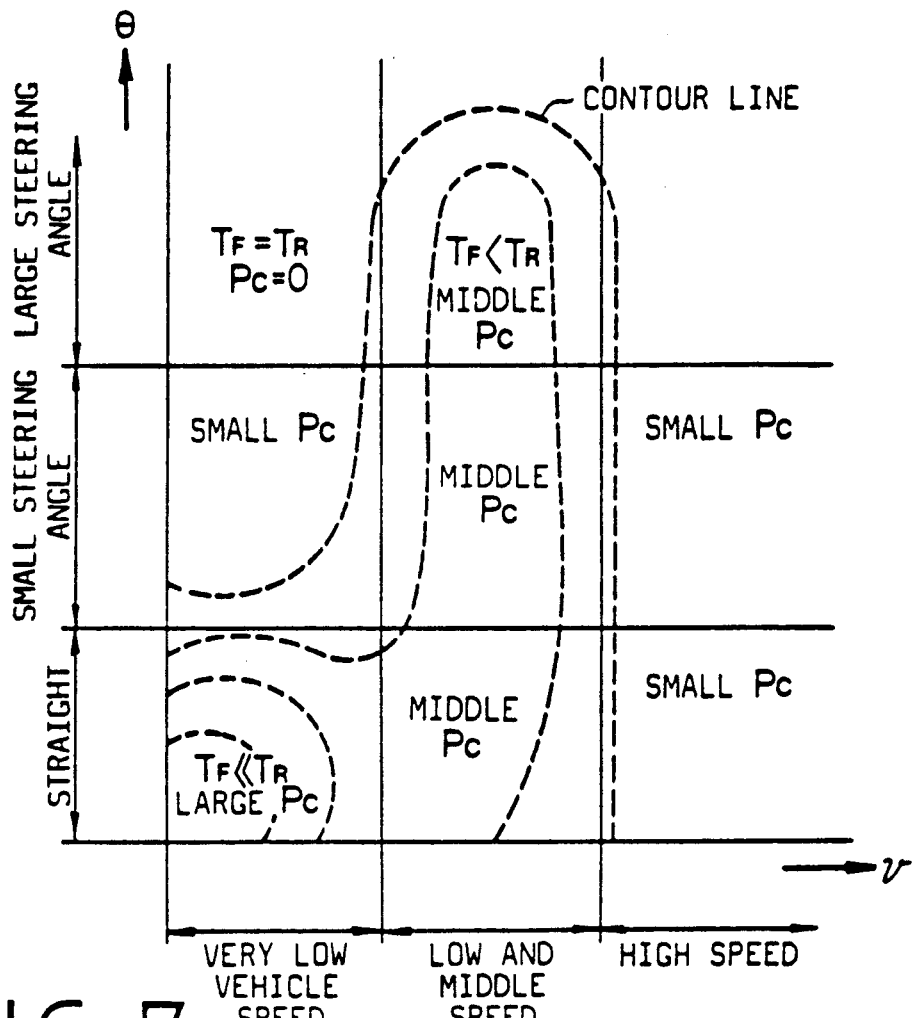
FIG. 7 shows a map provided in the control unit of the second embodiment.

As shown in FIG. 6, the control unit 20 comprises torque distribution ratio deciding section 32 to which signals $\theta$ and V from the sensors 24 and 25 are applied, and a memory 31 and an oil pressure calculator 33. The torque distribution ratio deciding section 32 reads out a distribution ratio $R_F$ for the front wheels from the memory 31 which has a map shown in FIG. 7. The map provides a distribution ratio $R_R$ depending on the steering angle $\theta$ and the vehicle speed V. For example, when the vehicle speed is extremely low and the steering angle is large, the distribution ratio $R_R$ becomes minimum. Thus, oil pressure $P_C$ in the clutch 11 becomes zero to release the clutch. Thus, $T_F = T_R$. To the contrary, when the steering angle is small, which means that the wheels are in straight-ahead position, while the vehicle speed is extremely low, the distribution ratio $R_R$ becomes large so as to provide a large torque to the rear wheels. When the vehicle is driven straightforwardly at a high speed, the distribution ratio $R_R$ is small. Other operations of the control unit are the same as those described through steps S103 to S107 in FIG. 4.

Accordingly, the second embodiment provides a system which prevents a tight corner braking phenomenon which is liable to occur during a parking operation when rear wheel torque is usually larger than the front wheel torque at low vehicle speed.

Figure 8:
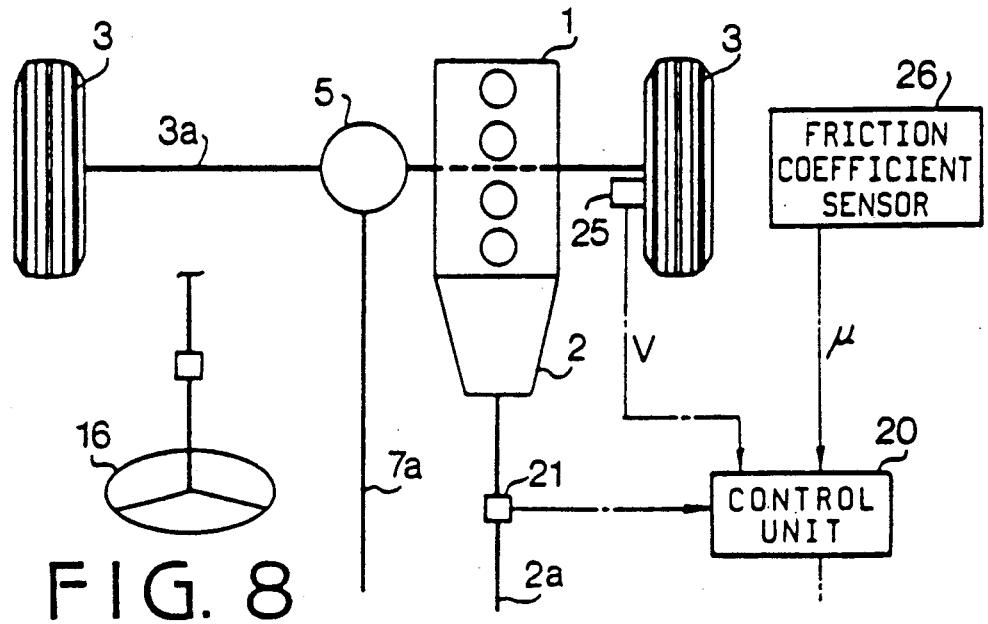
FIG. 8 shows a further embodiment of the present invention.

A third embodiment of the present invention, a system of which is partly shown in FIG. 8, relates to a system for controlling the torque distribution in accordance with coefficient of friction of road surface. When wheels which are on road surface having a small coefficient of friction $\mu$ and which sustain only a small vertical load are apt to spin. For example, if the torque is distributed to rear wheels at a large ratio when the vehicle is driven on a snowy road, the vehicle is liable to slue sideways. Accordingly, the control of the vehicle becomes difficult. Additionally, during acceleration, the torque is not sufficiently transmitted to the road surface. The present embodiment is for preventing spinning of the wheels without loss of torque under various driving conditions depending on such factors as load, and conditions of road surfaces.

Figure 9:
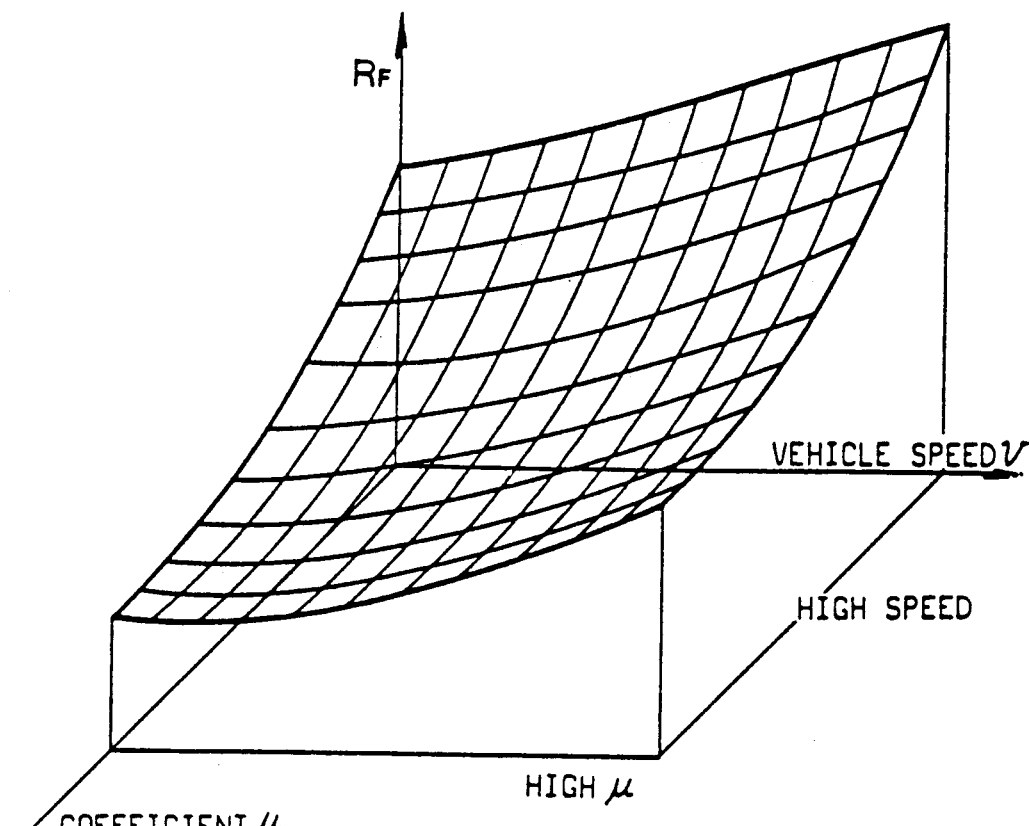
FIG. 9 is a graph showing torque distribution ratio in accordance with the vehicle speed and the coefficient of friction.

The present system has vehicle speed sensor 25 and a friction coefficient sensor 26 for detecting a coefficient of friction of the road surface. The torque distribution ratio deciding section of the control unit 20 is applied with the vehicle speed signal V and the coefficient of friction signal $\mu$. The memory of the present embodiment has a map shown in FIG. 9. The distribution ratio $R_F$ for the front wheels increases as the values of the vehicle speed increases and decreases as the valves of the coefficient of friction increases. Thus, excessive slue on slippery roads can be prevented while keeping stability at high vehicle speed and steerability at low vehicle speed.

The embodiment may be modified so as to provide a manual means actuated by a driver depending on road conditions.

Figure 10:
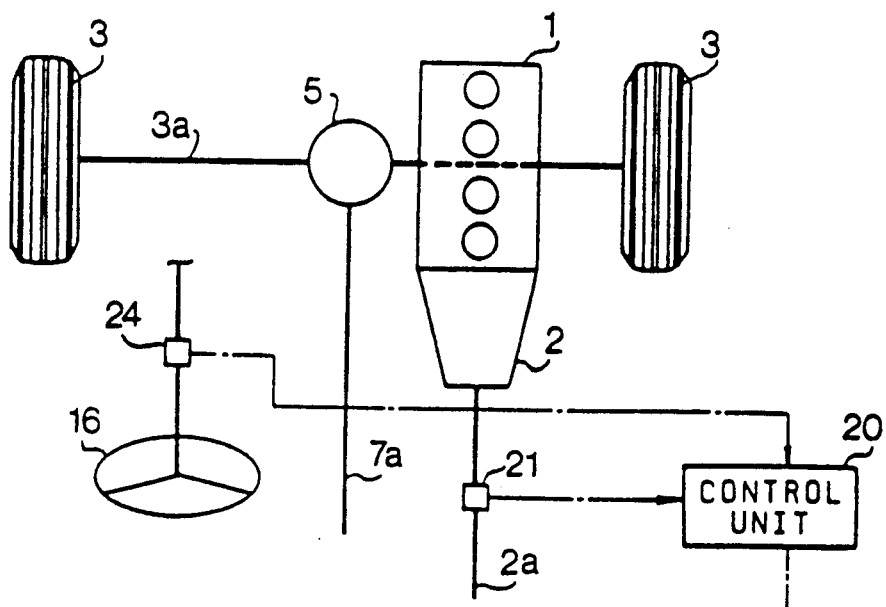
FIG. 10 shows a fourth embodiment of the present invention.
Figure 11:
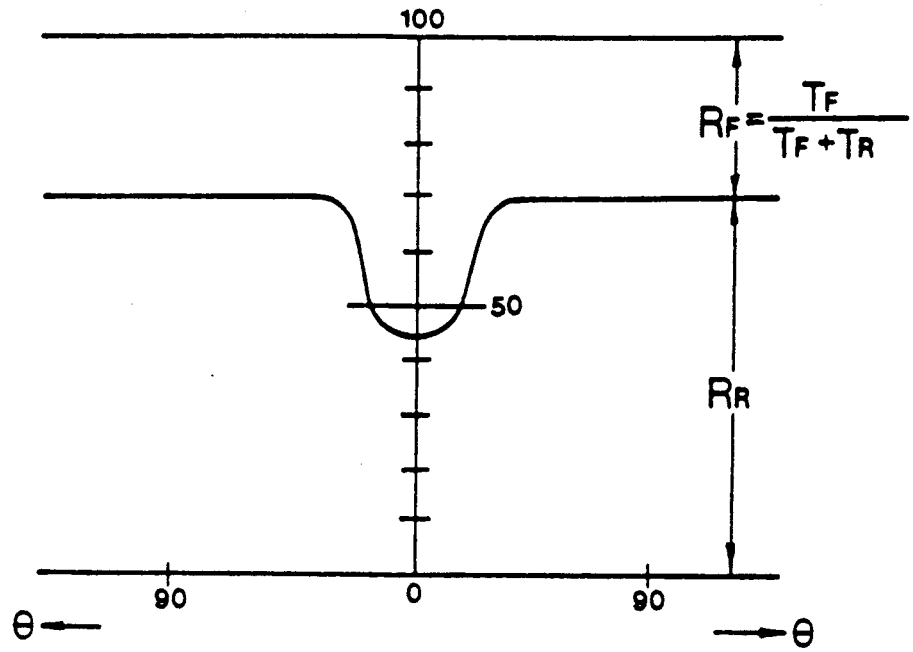
FIG. 11 is a graph showing torque distribution ratio in accordance with steering angle.

Referring to FIG. 10 showing the fourth embodiment of the present invention, the system is provided with the steering angle sensor 24, the output signal of which is applied to the control unit 20 which is identical to the one shown in FIG. 6. The memory in the control unit 20 is provided with a map having torque distribution ratios $R_F$ depending on the steering angle as shown in FIG. 11. When the steering wheel is kept at a neutral position, that is, the steering angle is within a predetermined value, the vehicle is driven straight. Thus, the distribution ratio for the front wheels $R_F$ is equal to the distribution ratio for the rear wheels $R_R$ ($R_F:R_R=50:50$). Accordingly, stability is obtained. When the steering angle exceeds the predetermined value, the distribution ratio $R_F$ becomes smaller than $R_R$ ($R_F:R_R=40:60$ to 20:80) thereby improving the steerability of the vehicle. The system may be modified so as to provide a slightly larger torque to the front wheels ($R_F:R_F=50:50$ to 70:30) when the vehicle is driven straight.

Thus, the stability can be obtained when driven straight at high-speed or driven on rainy or snowy roads and the steerability is improved when turning a corner without loss of overall torque.

Figure 12:
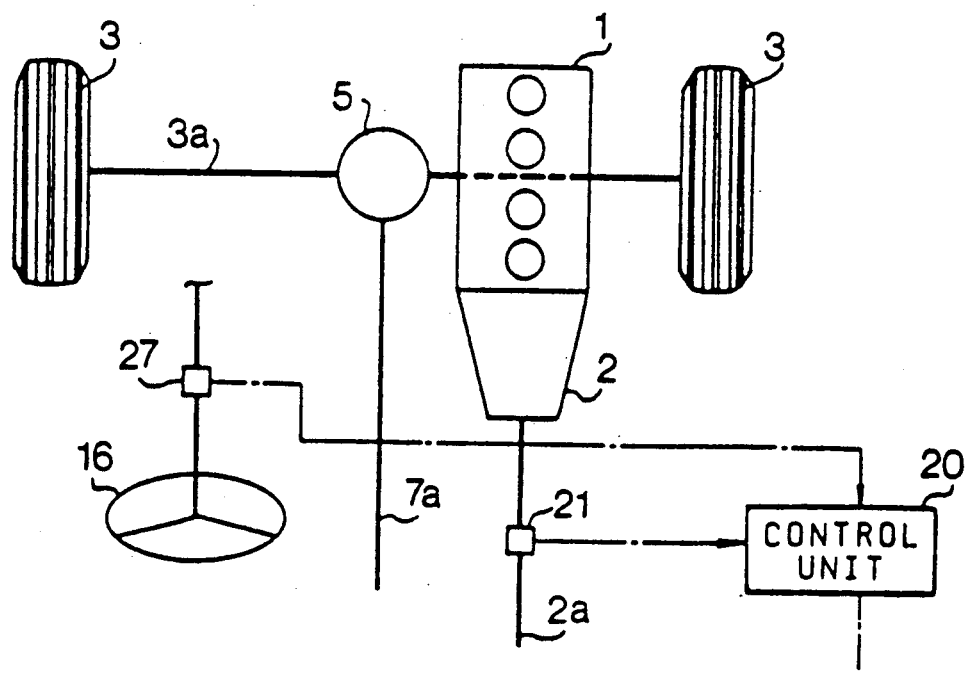
FIG. 12 shows a fifth embodiment of the present invention.
Figure 13:
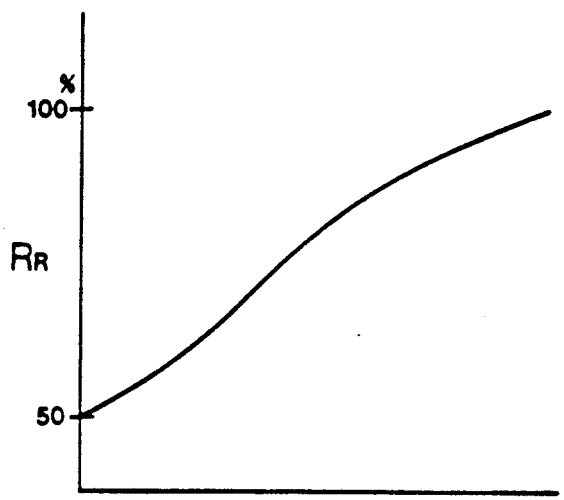
FIG. 13 is a graph showing a relationship between torque distribution ratio and steering torque.

FIG. 12 shows a further embodiment of the present invention which is provided with a steering torque sensor 27 for detecting steering torque $T_h$ applied to the steering wheel 16. The torque distribution ratio deciding section in the control unit 20 is supplied with an output of the sensor 27 as an address signal. The memory has a map shown in FIG. 13 storing distribution ratios $R_R$ for the rear wheels depending on the steering torque $T_h$. Accordingly, when the steering wheel 16 is kept at the neutral position and hence the steering torque $T_h$ detected by the steering torque sensor 27 is zero, the torque distribution ratio to the front and rear wheels is at 50:50. When steering torque $T_h$ increases in order to turn the vehicle, a larger torque is transmitted to the rear wheels so that the ratio becomes between 40:60 and 20:80.

Figure 14:
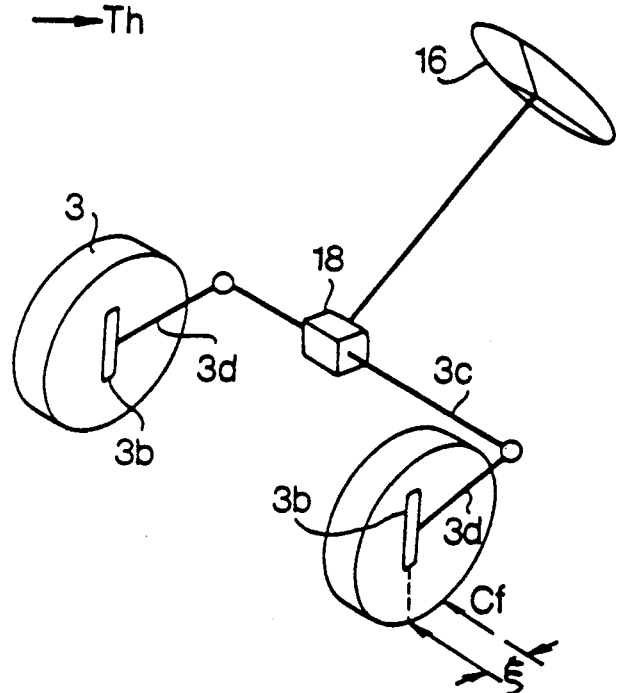
FIG. 14 is a schematic diagram of a steering system.
Figure 15:
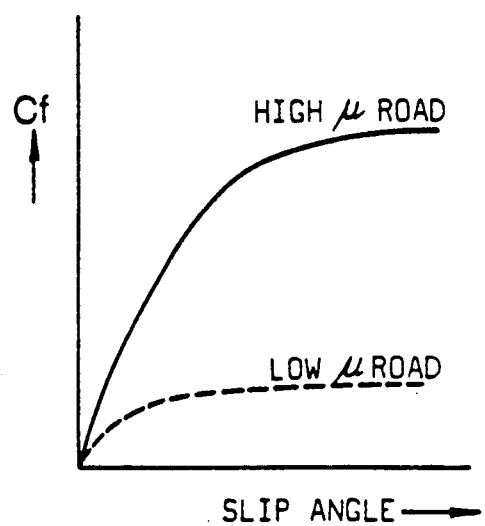
FIG. 15 is a graph showing a relationship between slip angle and cornering force exerted on a front wheel.

Referring to FIG. 14 showing a steering system, the steering torque $T_h$ applied to the steering wheel 16 turns the front wheels 3 through a steering gear 18, a tie rod 3c, steering arms 3d and king pins 3b. Moment at the axis of the king pin is balanced as described below.

$$T_h \cdot n = 2 (\xi p + \xi c) \cdot cf$$

where n is gear ratio of the steering gear 18, cf is a side force exerted on one of the front wheels, $\xi p$ is a peneumatic trail and $\xi c$ is a castor trail. Accordingly, the steering torque $T_h$ is proportional to the side force cf. Furthermore as shown in FIG. 15, the side force exerted on the front wheels 3 greatly varies with respect to the coefficient of friction $\mu$ of the road surface. When the coefficient of friction $\mu$ is small, side force cf is small and when the coefficient of friction is large, the side force becomes large. Thus, steering torque for acquiring a desired driving direction is small on a road having a small coeficient of friction. Thus, oversteer does not occur even though the rear torque is much larger than the front torque.

Accordingly, the distribution ratio $R_R$ for the rear wheels increases as the steering torque $T_h$ increases, consequently preventing oversteer on roads having a small coefficient of friction. On roads having a large coefficient of friction, since the rear wheel torque $T_R$ increases, understeer condition is cancelled.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive vehicle in which power of an engine is transmitted to front and rear wheels of the vehicle through a central differential, the system comprising
   a torque distribution device including clutch means for changing torque transmitted to the front and rear wheels,
   detecting means for detecting driving conditions of the vehicle including axle loads on the front and rear wheels of the vehicle for producing corresponding output signals, and
   control means responsive to the output signals for rendering the clutch means operative so as to change torque distribution ratio for the rear wheels.

2. The system according to claim 1, wherein
said control means comprises an axle load distribution calculator for calculating axle load distribution ratio from said output signals.

3. The system according to claim 1, wherein
said control means comprises,
a memory containing a range of a standard axle distribution ratio, and
means for determining that the calculated axle load distribution ratio is substantially within said range for rendering the clutch means operative so as to uniformly distribute the torque transmitted to the front and rear wheels.

4. The system according to claim 1, wherein
said control means comprises,
a memory containing a range of a standard axle distribution ratio,
means for determining that the calculated axle load distribution ratio is outside said range for providing a first signal, and
means for deriving a desired torque distribution ratio in response to said first signal for controlling said clutch means.

5. The system according to claim 4, wherein
said deriving means provides a larger desired torque distribution ratio for the rear wheels than that for the front wheels when the axle load on the rear wheels is larger than the axle load on the front wheels.

6. The system according to claim 1, wherein
said detecting means further detects output torque of a transmission which is connected between the central differential and the engine, and
said control means via said clutch means changes said torque distribution ratio as a function of the output torque of the transmission.

* * * * *